United States Patent [19]
Mohan

[11] Patent Number: 6,009,425
[45] Date of Patent: Dec. 28, 1999

[54] SYSTEM AND METHOD FOR PERFORMING RECORD DELETIONS USING INDEX SCANS

[75] Inventor: Chandrasekaran Mohan, San Jose, Calif.

[73] Assignee: International Business Machines Corporation, Armonk, N.Y.

[21] Appl. No.: 08/701,467

[22] Filed: Aug. 21, 1996

[51] Int. Cl.[6] .................................................. G06F 17/30
[52] U.S. Cl. ............................... 707/8; 707/101; 324/606
[58] Field of Search ..................................... 395/500, 767; 707/1, 3, 8, 101, 201, 200, 2; 711/141; 324/606

[56] References Cited

U.S. PATENT DOCUMENTS

| | | | |
|---|---|---|---|
| 3,916,387 | 10/1975 | Woodrum | 707/3 |
| 4,677,550 | 6/1987 | Ferguson | 707/3 |
| 4,754,326 | 6/1988 | Kram et al. | 364/900 |
| 4,821,336 | 4/1989 | Roye | 382/56 |
| 4,823,310 | 4/1989 | Grand | 707/8 |
| 4,914,569 | 4/1990 | Levine et al. | 395/500 |
| 4,945,474 | 7/1990 | Elliott et al. | 364/200 |
| 4,965,516 | 10/1990 | Parshotam et al. | 324/606 |
| 5,010,478 | 4/1991 | Deran | 364/200 |
| 5,123,104 | 6/1992 | Levine et al. | 707/1 |
| 5,218,696 | 6/1993 | Baird et al. | 707/1 |
| 5,230,047 | 7/1993 | Frey, Jr. et al. | 395/575 |
| 5,237,678 | 8/1993 | Kuechler et al. | 395/600 |
| 5,430,869 | 7/1995 | Ishak et al. | 707/101 |
| 5,440,732 | 8/1995 | Lomet et al. | 707/1 |
| 5,475,837 | 12/1995 | Ishak et al. | 707/101 |
| 5,485,607 | 1/1996 | Lomet et al. | 707/8 |
| 5,490,258 | 2/1996 | Fenner | 707/1 |
| 5,495,609 | 2/1996 | Scott | 707/8 |
| 5,537,574 | 7/1996 | Elko et al. | 711/141 |
| 5,551,027 | 8/1996 | Choy et al. | 707/201 |
| 5,551,046 | 8/1996 | Mohan et al. | 707/8 |
| 5,560,007 | 9/1996 | Thai | 707/3 |
| 5,694,608 | 12/1997 | Shostak | 395/767 |
| 5,717,919 | 2/1998 | Kodavalla et al. | 707/8 |
| 5,812,996 | 9/1998 | Rubin et al. | 707/2 |
| 5,832,508 | 11/1998 | Sherman et al. | 707/200 |

OTHER PUBLICATIONS

"Aries/KVL: A Key–Value Locking Method for Concurrency Control of Multiaction Transactions Operating on B–Tree Indexes", 16th VLDB Conference, Aug. 1990, C. Mohan, pp. 1–14.

(List continued on next page.)

Primary Examiner—Thomas G. Black
Assistant Examiner—Charles L. Rones
Attorney, Agent, or Firm—Gray Cary Ware Freidenrich

[57] ABSTRACT

A data manager of a relational database management system (RDBMS) receives a command, such as a DELETE. As the RDBMS processes this command, an index manager looks at cursor control block information about the scan position (page number, logical key position within page and log sequence number (LSN) of the page) and immediately accesses the corresponding leaf page to do the key deletion. If the page's log sequence number has not changed since the scan was positioned on it, the index manager knows precisely where the key is and deletes it right away. Even if the page's log sequence number has changed, the index manager checks to see if the key is still on the same page. Only if the key is not on that page anymore will the index manager traverse the tree from the root to locate the key. Using this same information, together with a return_current flag in the cursor control block, the method can easily determine the next key in the sequence. The return_current flag is set when the current key is deleted. If the leaf page's log sequence number has not changed since the deletion and the return_current flag is set, the method of the invention establishes that the key which now resides in the same logical position as the previously deleted key is the next key, and may be returned as such. If the LSN is the same and the return_current flag is not set, then the next key is returned following locking. If the LSN has changed but the key is still bound on the page, the next key is searched and located, a lock is asserted (if necessary) and the key is returned. Only if the page logical sequence number has changed and the previous key is no longer bound on the page will the index manager traverse the index tree to locate the next key, lock the key (if necessary) and return it.

30 Claims, 10 Drawing Sheets

| Key | PageID | Key Position | Page LSN | Return_Current | Lock Mode |
|---|---|---|---|---|---|
| | | | | 114 | 160 |

OTHER PUBLICATIONS

"Aries: A Transaction Recovery Method Supporting Fine–Granularity Locking and Partial Rollbacks Using Write–Ahead Logging", *Computer Science,* Jan. 19, 1989, Mohan et al., pp. 1–59.

"Commit LSN: A Novel and Simple Method for Reducing Locking and Latching in Transaction Processing Systems", Data Base Technology Institute, Jun. 29, 1994, C. Mohan, pp. 1–21.

"Interactions Between Query Optimization and Concurrency Control", Proc. 2nd Int'l Workshop on RIDE: Transaction and Query Processing, Feb. 1992, C. Mohan, pp. 1–9.

"NonStop SQL, A Distributed, High–Performance, High Availability Implementation of SQL", The Tandem Database Group, Apr. 1987, pp. 1–43.

"Aries/IM: An Efficient and High Concurrency Index Management Method Using Write–Ahead Logging", Proc. SIGMOD International Conference on Management of Data, Jun. 1992, C. Mohan et al., pp. 1–10.

"Concurrency Control and Recovery Methods for B+–Tree Indexes: Aries/KVL and Aries/IM", *Computer Science,* Mar. 1, 1994, C. Mohan, pp. 1–44.

"Single Table Access Using Multiple Indexes: Optimization, Execution and Concurrency Control Techniques", *Computer Science,* Mar. 2, 1990, C. Mohan, pp. 1–15.

FIG. 2A
(PRIOR ART)

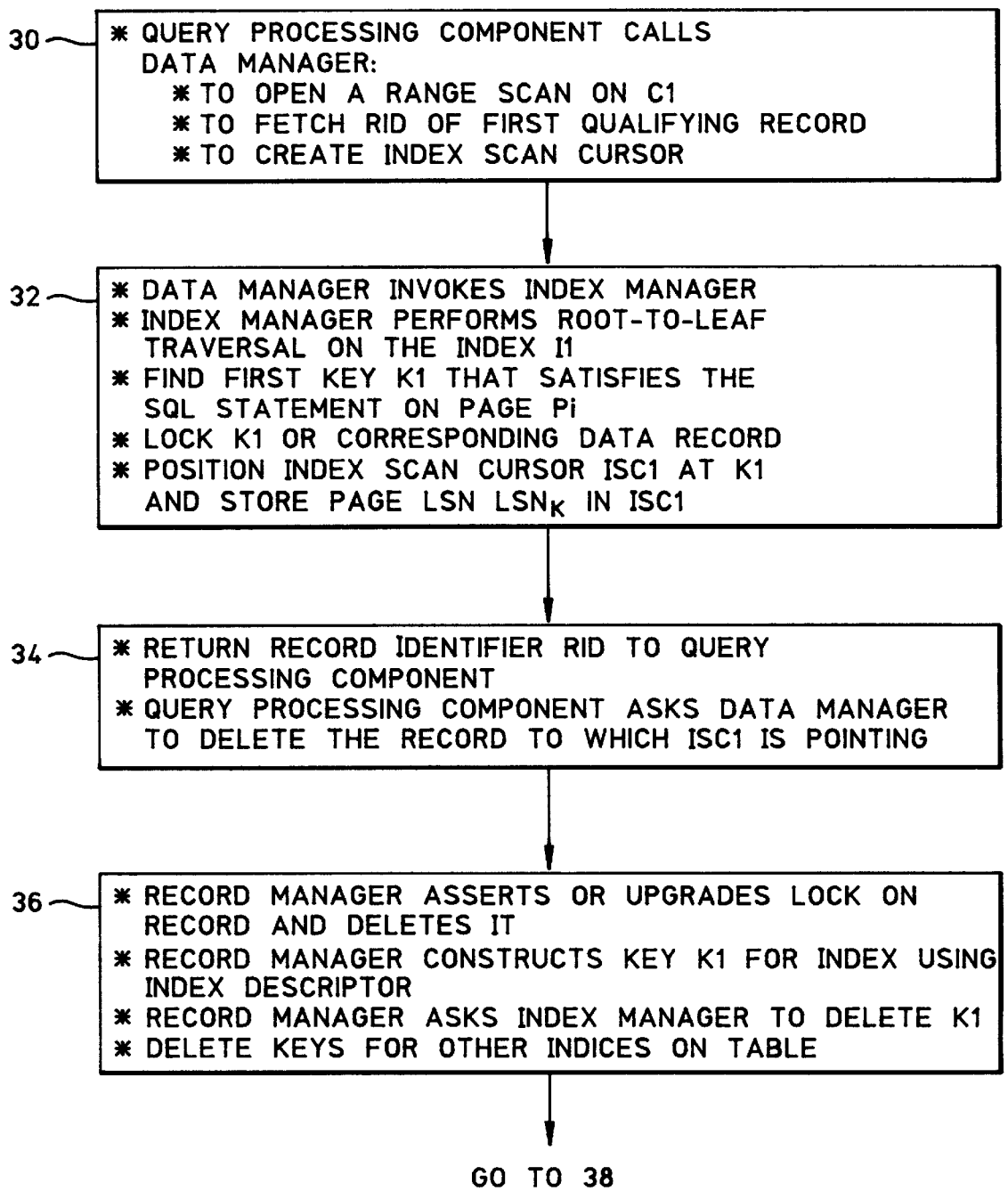

30 — * QUERY PROCESSING COMPONENT CALLS DATA MANAGER:
  * TO OPEN A RANGE SCAN ON C1
  * TO FETCH RID OF FIRST QUALIFYING RECORD
  * TO CREATE INDEX SCAN CURSOR

32 — * DATA MANAGER INVOKES INDEX MANAGER
* INDEX MANAGER PERFORMS ROOT-TO-LEAF TRAVERSAL ON THE INDEX I1
* FIND FIRST KEY K1 THAT SATISFIES THE SQL STATEMENT ON PAGE Pi
* LOCK K1 OR CORRESPONDING DATA RECORD
* POSITION INDEX SCAN CURSOR ISC1 AT K1 AND STORE PAGE LSN $LSN_K$ IN ISC1

34 — * RETURN RECORD IDENTIFIER RID TO QUERY PROCESSING COMPONENT
* QUERY PROCESSING COMPONENT ASKS DATA MANAGER TO DELETE THE RECORD TO WHICH ISC1 IS POINTING

36 — * RECORD MANAGER ASSERTS OR UPGRADES LOCK ON RECORD AND DELETES IT
* RECORD MANAGER CONSTRUCTS KEY K1 FOR INDEX USING INDEX DESCRIPTOR
* RECORD MANAGER ASKS INDEX MANAGER TO DELETE K1
* DELETE KEYS FOR OTHER INDICES ON TABLE

GO TO 38

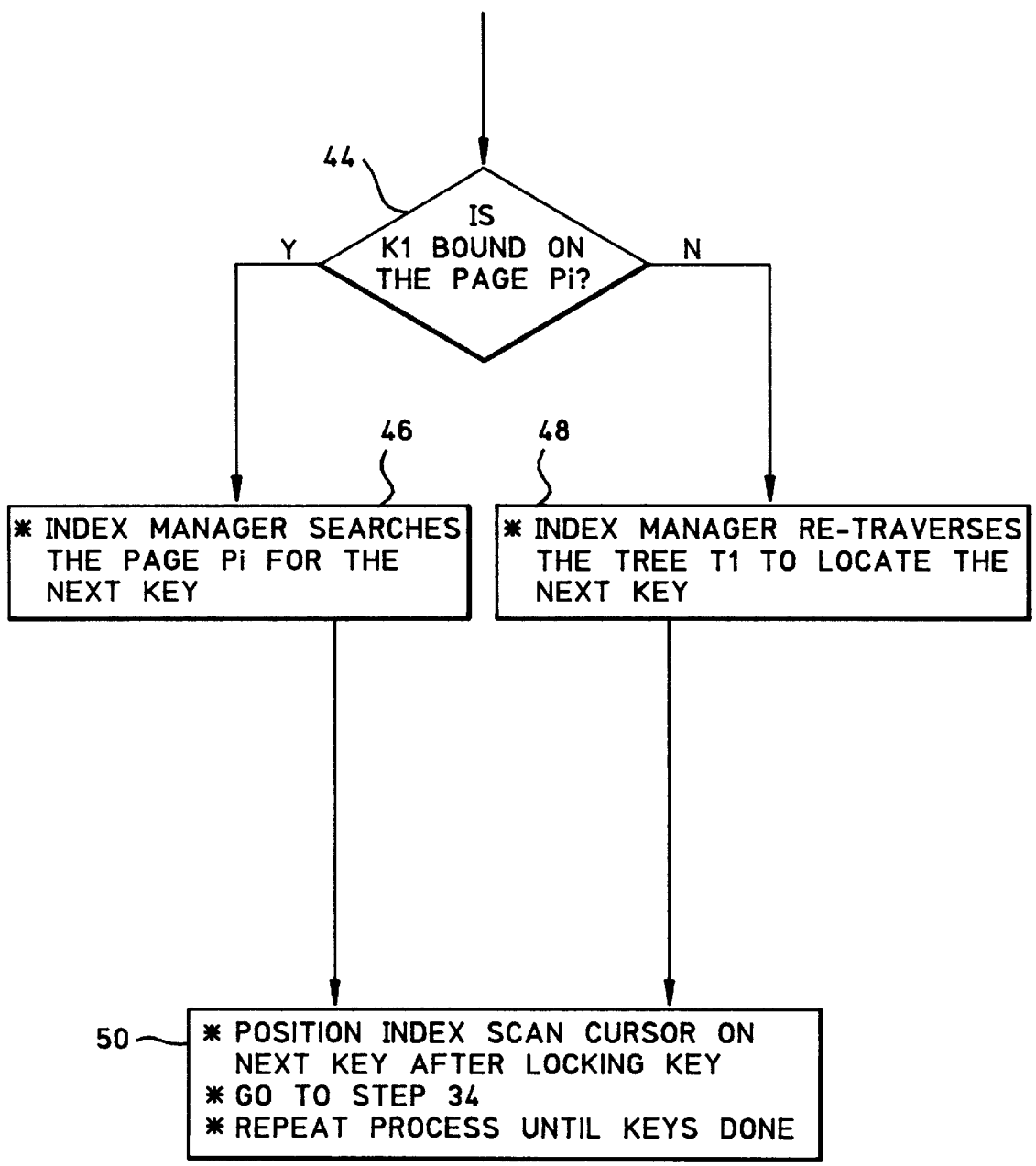

SYSTEM AND METHOD FOR PERFORMING RECORD DELETIONS USING INDEX SCANS

FIELD OF THE INVENTION

The invention generally relates to the field of data processing methods and systems. More specifically, the invention relates to a method and apparatus for management of records in database systems. Still more particularly, the invention concerns a data base storage system in which the data (e.g., records in a file) are stored separately from searchable index files corresponding to the data.

REFERENCES

The following technical papers and other references may be relevant to the invention described and/or claimed in the present patent application, and are cited by number at various points herein:

[1] Mohan, C., Haderle, D., Lindsay, B., Pirahesh, H., Schwarz, P., ARIES: A Transaction Recovery Method Supporting Fine-Granularity Locking and Partial Rollbacks Using Write-Ahead Logging, ACM Transactions on Database Systems, vol. 17, no. 1, March 1992. (Also available as IBM Research Report RJ6649, IBM Almaden Research Center, January 1989; Revised November 1990.)

[2] Mohan, C., Haderle, D., Wang, Y., Cheng, J., Single Table Access Using Multiple Indexes: Optimization. Execution and Concurrency Control Techniques, Proc. International Conference on Extending Data Base Technology: Venice, March 1990. (An expanded version of this paper is available as IBM Research Report RJ7341, IBM Almaden Research Center, March 1990; Revised May 1990.)

[3] Mohan, C., ARIES/KVL: A Key-Value Locking Method for Concurrency Control of Multiaction Transactions Operating on B-Tree Indexes, Proc. 16th International Conference on Very Large Data Bases:, Brisbane, August 1990. A different version of this paper is available as IBM Research Report RJ7008, IBM Almaden Research Center, September 1989.

[4] Mohan, C. Commit LSN: A Novel and Simple Method for Reducing Locking and Latching in Transaction Processing Systems, Proc. 16th International Conference on Very Large Data Bases: Brisbane, Australia, August 1990.

[5] Mohan, C. Interactions Between Query Optimization and Concurrency Control, Proc. 2nd International Workshop on Research Issues on Data Engineering: Transaction and Query Processing: Tempe, February 1992. Also available as IBM Research Report RJ8681, IBM Almaden Research Center, March 1992.

[6] Mohan, C., Levine, F. ARIES/IM: An Efficient and High Concurrency Index Management Method Using Write-Ahead Logging, Proc. ACM SIGMOD International Conference on Management of Data, San Diego, June 1992. A longer version of this paper is available as IBM Research Report RJ6846, IBM Almaden Research Center, August 1989.

[7] The Tandem Database Group, NonStop SQL: A Distributed, High-Performance, High-Availability Implementation of SQL, Proc. 2nd International Workshop on High Performance Transaction Systems: Asilomar, September 1987. Also in Lecture Notes in Computer Science Vol. 359:, D. Gawlick, M. Haynie, A. Reuter (Eds.), Springer-Verlag, 1989.

[8] Mohan, C. Concurrency Control and Recovery Methods for B+-tree Indexes: ARIES/KVL and ARIES/IM, Performance of Concurrency Control Mechanisms on Centralized Database, Systems, V. Kumar (Ed.), Prentice Hall, 1994.

BACKGROUND OF THE INVENTION

DATABASE ORGANIZATION, RECORD ACCESS

Database management, or transaction processing, systems are well known. These systems are generally utilized to provide rapid access to database tables which contain a plurality of data records. A relational transaction processing system provides access to multiple database tables, where elements of one database table are generally related to elements in another database table. A relational database allows a user to search, access, and alter data contained in multiple database tables using one or more specific elements or fields. One important aspect of all such database systems is the ability of the system to provide rapid and efficient access to individual records in each database. Recently, database management systems (DBMS) and relational database management systems (RDBMS) have been provided, which support the utilization of the database by multiple users simultaneously, allowing users to access specific data concurrently.

An index file is commonly used by database management programs to provide quick and efficient access to records in tables of the database, which are said to be indexed by the index file. The index file corresponds to one or more fields of the database table and facilitates database searching by arranging the values of the fields in a contiguous sequence. These index files are commonly configured in a multi-level B-Tree structure. An index file configured as a B-Tree structure includes a root node, and many levels of nodes branching from the root node. The information contained in these nodes includes pointers to the nodes at the next level, or pointers to the records in the database. These pointers include further information, termed key record information, which may reference the records in the database. The record keys are in an ordered form throughout the nodes.

For example, an index tree (FIG. 1) may be built to provide an alphabetic listing of employee names stored in the records of a database. A root node 2 includes reference keyed data that relates to records directly or indirectly referenced by the next level 4 of nodes. The reference keys contain information about the indexed field, which on the index tree of FIG. 1 is the spelling of employees' names. Therefore, the ordered keys in the root node 2 point to the next successive level 4 of nodes.

In the example of FIG. 1, a first successive node 6 indirectly or directly references all employee names beginning with A, B, or C. A next successive node 8, parallel with the first successive node 6, contains employee records for employees whose last names begin with the letters D through M. A last successive node 10 on the level 4 references records of employees whose last names begin with N through Z. As a user searches through successive levels of nodes in the index file tree, a bottom node, or "leaf node," is eventually reached. The contents of this bottom node include record keys that point to the individual records in storage. For instance, a leaf node 12 in FIG. 1 includes a key that points to the individual employee record for the employee Arthur Able.

AN EXAMPLE OF A DATABASE OPERATION

Consider the following set-oriented Structured Query Language (SQL) delete statement:

DELETE

FROM T1

WHERE C1>10 AND C1<20 where T1 is the name of a table containing a set of data records, including a column (field) C1 having numerical values corresponding to individual records of the table. Assume that an index on C1 exists (call it I1) and that the RDBMS includes an optimizer that chooses to use I1 and perform a range scan to determine the set of records to be deleted whose C1 value satisfies the specified range condition (i.e., C1 value lies between 10 and 20). These sorts of deletes are very commonly issued by RDBMS users.

Deletes like these are also generated internally by RDBMSs to implement referential integrity (i) when cascade-on-delete is the rule and there is an index on the foreign key of the child table, (ii) where that key is the primary key of the parent table, and (iii) where a parent record deletion's effect needs to be propagated to the child table.

The conventional approach to execution of such a statement would include traversing the index tree structure to find a record to which the command applies. When the appropriate index key is found, the corresponding record, following appropriate index and record locking is deleted. The index key corresponding to the deleted record is also then deleted. This requires re-traversing the index tree to relocate the key. Using an iterator to keep track of each database record being deleted, this tree multi-pass tree traversal and locking process is thereafter repeated until all records satisfying the command parameters, and their corresponding keys, are deleted.

This example represents the state of the art in terms of computing performance. However, the conventional execution strategy may require as many as 3N data lock calls and 4N index lock calls, together with as many as N root to leaf traversals, where N is the number of records to be deleted. These lock calls and index traversals consume a disadvantageously large amount of processing time, and have been a source of dissatisfaction to customers of operating systems and data base systems.

SUMMARY OF THE INVENTION

It thus is an object of the invention to avoid excessive lock calls and index tree traversals in situations where the affected leaf nodes (pages) of the index tree are not modified in the interim by other transactions. In accordance with the invention, retraversal of the index tree to locate a key is avoided when the leaf page has not been changed by other concurrent transactions. A method according to the invention takes advantage of knowledge generated by a previous operation to render the traversals unnecessary. Relatedly, the number of lock calls may be reduced by utilizing information concerning previous lock modes and by testing for non-index related predicates.

To achieve this and other objects, there is provided in accordance with the invention a method, for use with a data base management system in which an iterator is used for specifying one of a plurality of records in a data structure within a data base, for performing an operation on the plurality of records within the data structure, the records having related locations searchable in an index file configured as a tree structure and containing a sequence of record keys. The method includes a first step of traversing the tree structure to locate a first one of the sequence of record keys. A second method step stores iterator information related to the location of the first one of the sequence of record keys in an iterator data structure. A third method step performs an operation on a record corresponding to the located record key. A fourth method step checks whether the first record key's tree position has been affected by a concurrent operation. If the first record key's tree position has not been affected, a fifth method step updates that key using the stored iterator information. A sixth method step checks whether the first record key's tree position has been affected by a further concurrent operation other than the updating operation. If not, a final method step locates a next one of the sequence of record keys based on the stored iterator information. Preferably, the iterator data structure itself is used to determine whether record key's tree position has been affected by a concurrent operation. In a further aspect of the invention, information about previous lock modes is used to reduce the number of subsequent lock calls made on the record keys and corresponding data.

Thus, a method in accordance with the invention takes advantage of the stored iterator information to locate a second one of the sequence of record keys, and avoids having to traverse the tree structure again. As a consequence, an advantageous improvement in speed and performance is provided. While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

BRIEF DESCRIPTION OF THE DRAWINGS

FIGS. 2A, 2B, and 2C are a detailed flowchart of a conventional method for executing a database command (Prior art).

DESCRIPTION OF THE PREFERRED EMBODIMENT

Figure 1:
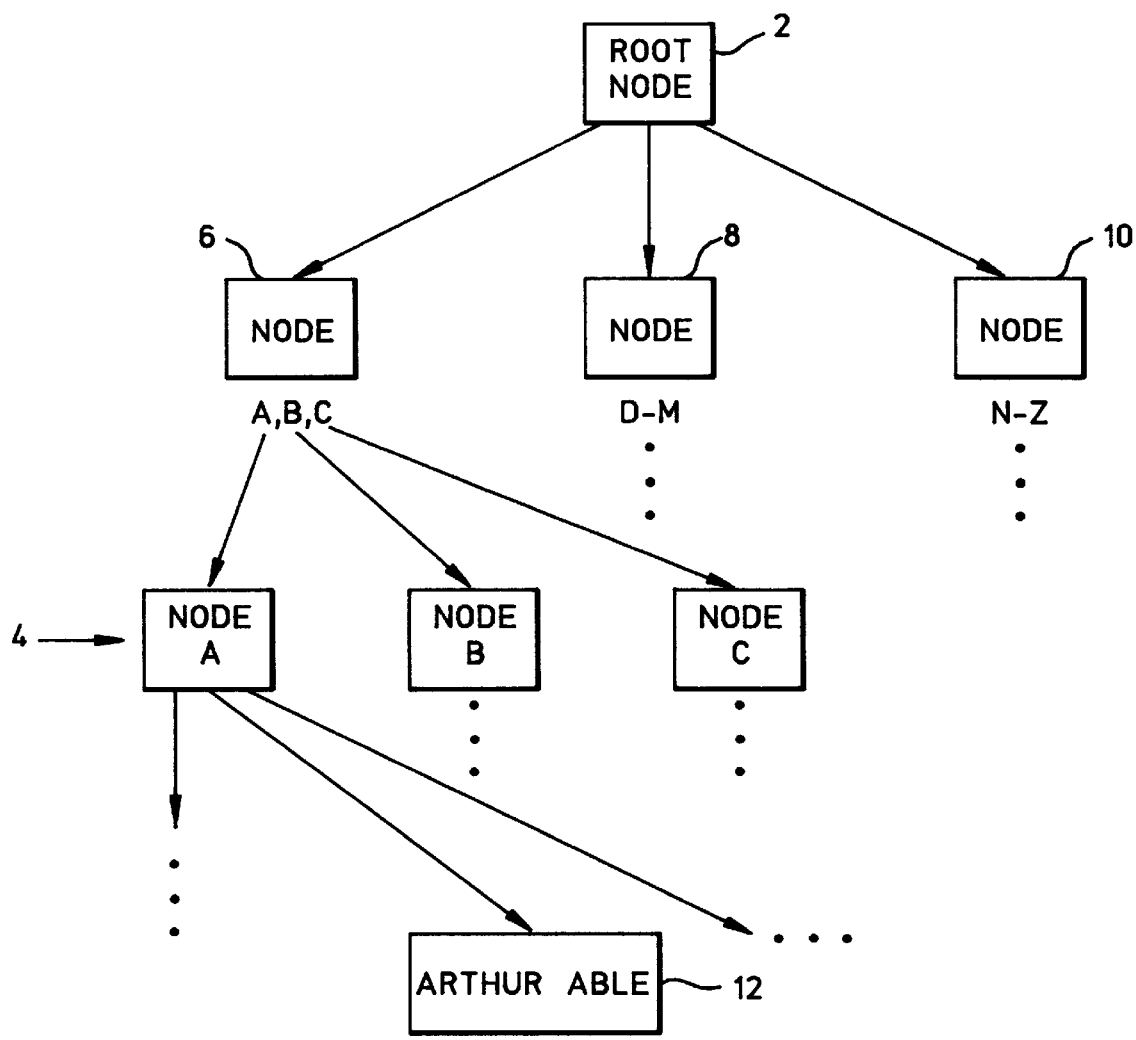
FIG. 1 is a block diagram of an exemplary B-tree representation of data records stored in a database system (Prior art).

A detailed description of the invention, and of its performance in executing the sample database operation given above, will be given below. However, first, some relevant information of a general nature will be given. Then, a more detailed description of a conventional implementation of the database operation will be given, for comparison with a detailed description of the preferred embodiment of the method of the invention.

BACKGROUND INFORMATION ON THE USE OF CURSORS

Relational data base management systems (RDBMS) implement the concept of a cursor. A cursor is a construct (an iterator) used to scan and process a set of data (records, keys, tuples, etc., satisfying certain conditions), one at a time.

In the discussion which follows, various types of cursor operation will be described in terms of commands in IBM Corporation's DB2 data base product. (IBM and DB2 are trademarks of International Business Machines Corporation.) It is believed that the reader who is skilled in the field of data base technology either will be familiar with the above IBM product, or will be familiar in general with cursor operations in data base technology, such that he/she will find the commands to be self-explanatory based on their names or on the context in which they are discussed. Therefore, formal definitions of these commands will, in general, be omitted. For further information in this area, the reader is encouraged to consult IBM's DB2 product literature.

RDBMSs implement two types of cursors: user cursors and system cursors. A user cursor directly corresponds to a cursor defined in a user application using an SQL DCL CURSOR statement. System cursors are the ones that the RDBMS defines and uses internally to produce the results needed to satisfy users' queries. One or more system cursors might be used to produce the output corresponding to a single user cursor. An example of a situation when a single user cursor might be implemented using multiple system cursors is one where the query requires accessing multiple tables (e.g., a join operation). In such a situation, each of the tables' data will be accessed using a separate system cursor. It is also possible that there are some system cursors in use which do not relate to any user cursors. This will be the case when set-oriented delete and update SQL statements are issued by the user (i.e., DELETE/UPDATE . . . FROM . . . WHERE . . . ).

An access path is used to implement a system cursor. The most common access paths are sequential scans of a table's data pages (a table scan cursor (TSC)) and range scans on a B+-tree index (an index scan cursor (ISC)). Both system cursors and user cursors might operate over permanent data as well as temporary data (e.g., intermediate or final results stored in temporary tables or workfiles). Even if a user cursor requires accessing only a single table's data, multiple system cursors might have to be used, due to the exploitation of query processing techniques like index ANDing/ORing.

CURSOR CONTROL BLOCK

Information relating to a cursor is represented using a cursor control block (CCB). The most important attributes of a cursor, which are among the information provided in a cursor control block, are listed and discussed as follows:

1. Is the cursor open or not?

Only when a cursor is open, can a next (or fetch) call be issued to get the next piece of data in the set of data over which the cursor is defined.

2. Does it have a valid position?

A user cursor has a valid position if it is positioned on a piece of data that still exists. This means that any time a DBMS deletes a record, it has to make sure that all those user cursors of that transaction which are positioned on that record are invalidated. Invalidation will prevent an UPDATE or DELETE WHERE CURRENT OF CURSOR from being processed, until the cursor position becomes valid again by the issuance of a next call. The reason invalidation is important becomes clear upon consideration of the following situation: Suppose that a new record is inserted, and is assigned the same record identifier as that of a previously deleted record; that is, suppose a previously used record identifier is reused. Then, suppose that a cursor, which had been pointing to the deleted record, is never invalidated. If a cursor-based update or delete, intended for the deleted record, is processed after such a reuse of the record identifier, the new record would incorrectly get updated or deleted. Of course, the situation gets much more complicated with the use of optimizations like blocking of the transfer of the records satisfying the user's query, as described in [5], and the support of features like scrollable cursors. More sophisticated techniques are needed to avoid such errors when those features are supported. Since cursor-based deletes and updates are specified by users only with reference to user cursors, there is no need to perform invalidations of system cursors. In the case of set-oriented delete and update statements where the DBMS creates system cursors without any related user cursors, one component of the system will issue cursor-based deletes and updates with reference to those system cursors. Even if only one system cursor is being used to support a given user cursor, the positions of the user and system cursors might be different at any given point in time due to the support of features like blocking and scrollable cursors.

3. If a cursor has a valid position, what is it?

In the case of a TSC, it is the record identifier (RID) of the record on which the cursor is positioned. In the case of an ISC, it is the key (key value, RID pair) on which the cursor is positioned.

4. Is a cursor updatable?

If a cursor is updatable, then the SQL statements UPDATE WHERE CURRENT OF CURSOR and DELETE WHERE CURRENT OF CURSOR can be used with such a cursor. When such a statement is issued against an updatable user cursor which has a valid position, the record on which the cursor is currently positioned is updated or deleted. In the case of an update, the cursor continues to be positioned on the same record. In the case of a delete, the cursor no longer has a valid position. Typically, a user cursor is updatable if it does not involve any joins and it does not contain an ORDER BY or a GROUP BY clause.

INDEX LOCKING

Sophisticated concurrency control is employed while accessing indexes to assure that several properties are satisfied. One property is serializability (or repeatable read). In the case of unique indexes, another property to be guaranteed is assuring that no two keys with the same key value are present at any time in the index. Various sophisticated index locking protocols are described in [3] and [6]. Two types of locking are done in those protocols: data-only locking and index-specific locking.

With data-only locking, a lock on a key is equated to a lock on the corresponding piece of data that contains the key. For example, with data-only locking and record locking granularity, to lock a key, the index manager (IM) locks the record whose RID is present in the key.

Data-only lock name:=<TableID, RID(Key)>

With data-only locking and page locking granularity, to lock a key, the index manager IM locks the data page whose PageID is present in the RID in the key.

Data-only lock name:=<TableID, PageID(Key)>

With index-specific locking, a lock on a key is made to be different from the lock on the corresponding piece of data that contains the key. For example, with index-specific locking and record locking granularity, Index-specific lock name:=<IndexID, RID(Key)>

With index-specific locking and page locking granularity,

Index-specific lock name:=<IndexID, PageID(Key)>

Tradeoffs are involved in choosing between index-specific locking and data-only locking [8]. Index-specific locking requires more locks to be acquired for most operations compared to data-only locking. But under some conditions, index-specific locking can support higher levels of concurrency.

In order to guarantee serializability whenever a key is deleted (due to a record deletion or a record update which causes the key value to change), an exclusive (X) lock for commit duration (i.e., for the duration of the transaction) is obtained on the next higher key that currently exists in the index. It is this next key lock which blocks subsequent readers who look for the delete key until the deleting transaction terminates. In a similar fashion, a next key lock is acquired momentarily (instant duration) on the next key during the insert of a key to make sure that the insert is not going to interfere with a reader who has already searched for (and not found) the key being inserted. If such a read transaction is still executing, the inserter's next key locking delays the insert since a reader obtains a shared (S) lock for commit duration on the next key if the reader does not find the key that it is looking for (S is compatible with S, but is incompatible with X). The mode (X, IX, etc.) in which the next key lock is acquired during inserts is unimportant for the discussions herein. For details, the reader should refer to [3], [6] and [8].

Typically, when the data manager (DM) is called by the query processing component or relational data system (RDS) for a record to be fetched via a cursor, the query processing component RDS will know more about why the record is being retrieved:

only for reading—a non-updatable cursor definitely for being updated/deleted—a set oriented delete/update statement with no residual predicates possibly for being updated/deleted—a set-oriented delete/update statement with residual predicates or updatable cursor (i.e., the user might issue an update/delete where current of cursor)

Consequently, the query processing component RDS indicates to the data manager DM what mode of lock should be acquired on the record when the record is fetched via a cursor. Typically, the query processing component RDS asks the data manager DM to get an S lock. In some systems, when the query processing component RDS suspects or knows for sure that the fetched record would be updated/deleted subsequently by the current transaction, then, to reduce the likelihood of deadlocks, the query processing component RDS asks for an update (U) lock to be acquired. Since U is incompatible with U and X, but is compatible with S, this ensures that no other transaction would be able to obtain a U lock on the same record until the current transaction terminates. For this case, if only an S lock were to be obtained, then two different transactions could both first get S locks. Later, both may try to update/delete the record at which point both will try to get X locks and thereby create a deadlock situation. Some systems avoid such a possibility by using U locks.

Typically, acquiring a lock in the absence of contention, requires 100s of instructions. DBMS and application designers normally spend a significant amount of effort in minimizing the cost of locking by reducing the number of locks, number of lock calls, etc., while at the same timer permitting a high degree of concurrency. See [4].

DETAILED IMPLEMENTATION OF CONVENTIONAL DATABASE OPERATION

Figure 2B:
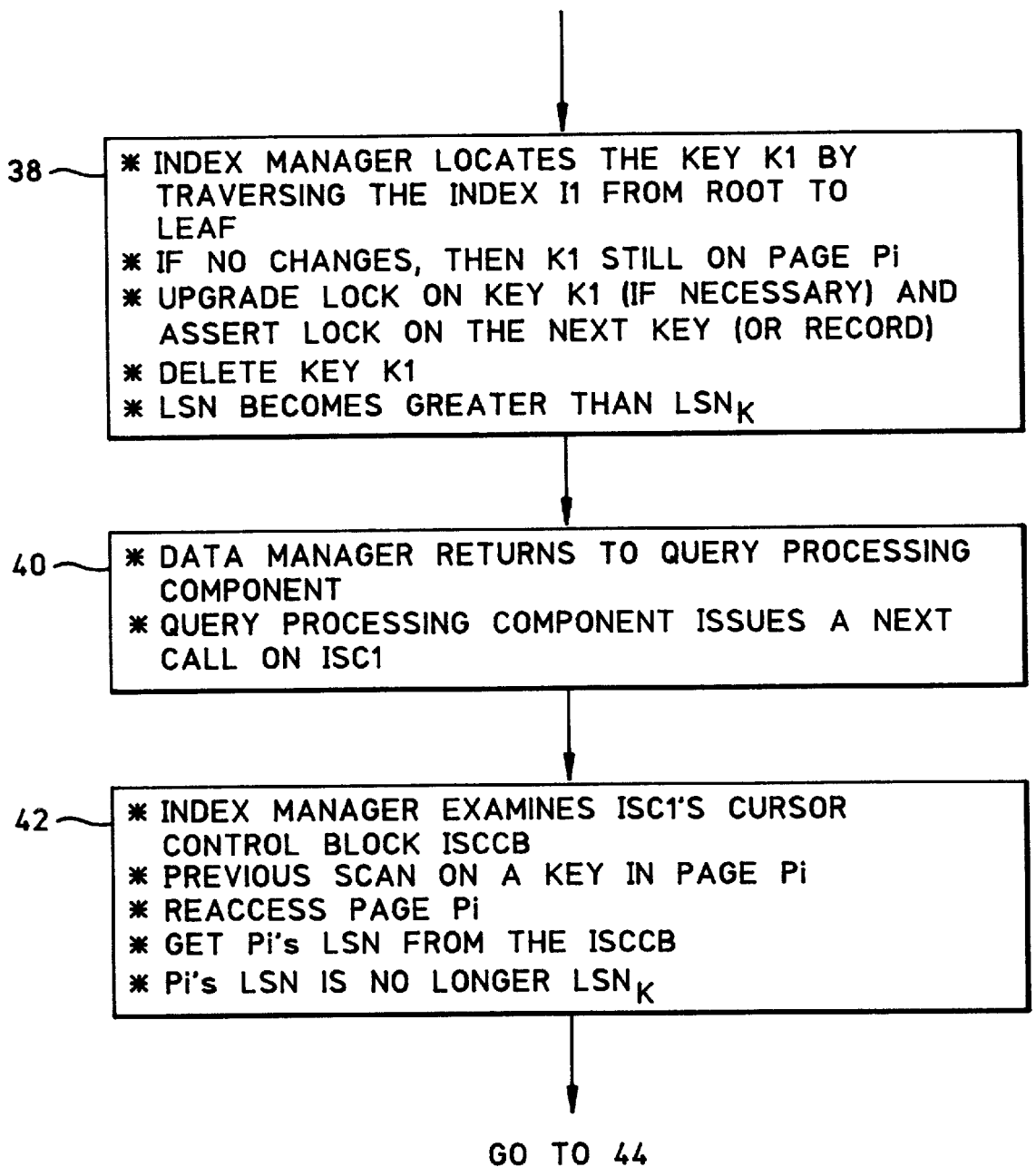

On a more detailed level, the conventional approach to executing the example database operation given above, in existing RDBMSs, would involve, essentially, the steps which follow (illustrated in block diagram form in FIG. 2). These steps are typically implemented as software programs executing on a general purpose programmable computer. Recalling that the database transaction of interest as follows:

DELETE
FROM T1
WHERE C1 > 10 and C1 < 20, a number of steps are performed in conventional RDBMSs.

STEP 30

First, the query processing component RDS calls the data manager DM to open a range scan on the C1 index, and to fetch the record identifier RID of the first qualifying record. Let the index scan cursor (ISC) so created be called ISC1. The query processing component RDS requests the qualifying data to be locked in S or U mode.

STEP 32

The data manager DM invokes the index manager IM, which performs a root-to-leaf traversal on the index I1 to locate the first key whose key value is greater than 10, thereby satisfying the above SQL DELETE statement. The leaf page is designated Pi. Let that key be designated K1. As per the above discussion of cursor positioning, the key K1 is represented in terms of an index scan cursor pair, including a key value and a record identifier. For the key K1, this pair is designated <KV1, RID1>.

As a result of this action, the key K1 is locked in S or U mode, as described above. If index-specific locking is being done, see [3] and [6], then the lock is acquired on the key itself, and this lock is different from a lock on the data from which the key was derived. If data-only locking is being done, then the lock is actually on the underlying data (e.g., on the record identifier RID1 if the locking granularity is a record).

The index scan cursor ISC1 is positioned on the key K1, and the identifier (ID) of the leaf page (designated as page Pi), the logical position of the key K1 on the page (for example, the j-th key) and the log sequence number (LSN) (as given in [1]) of the page (say LSNk) are recorded in the index scan cursor control block ISCCB for use during a next call. See also [3] and [6].

STEP 34

The data manager DM returns the record identifier RID1 to the query processing component RDS, which then immediately requests the data manager DM to delete the record on which the index scan cursor ISC1 is positioned (the one with record identifier RID1).

STEP 36

The record manager (RM) then acquires an X lock on the record identifier RID1 and deletes the record. If the index manager IM was doing data-only locking, then this locking is an upgrading of the earlier acquired S or U lock to an X lock. Otherwise, the locking is a new lock on the record identifier RID1. Next, because the data manager DM is oblivious to the fact that the I1 index was already used to find the record identifier RID1, the record manager RM proceeds to reconstruct a key from the data table containing the identified record. The record manager RM consults a system index table, examines the descriptor for the index I1, creates a key, designated K1, for that index, and asks the index manager IM to find and delete the key K1. Note that even though the key for the index I1 is already known, existing DBMSs waste their time looking up the index descriptor for the index I1 and reconstructing the key K1. This reconstruction is needed, however, if there are other indices on the table T1. Then the record manager RM must make sure that their keys for the identified record are also deleted.

STEP 38

The index manager IM traverses the index I1 from root to leaf to locate the key K1. Assuming that no changes had taken place on the page Pi between the time of key lookup and the time of key deletion, the leaf page arrived at would still be the page Pi. If index-specific locking is being done, then the index manager IM would lock the key in X mode by upgrading the previous S or U mode lock. If data-only locking is being done, then the key would already be locked in X mode as a result of the previous data lock asserted prior to record deletion. In all cases, the next key (in the case of index-specific locking) or the next record (in the case of data-only locking) would be locked in X mode before the deletion of the key K1 is performed. As a result of the logging of this key deletion and the consequent updating of page_LSN (see [6]), the log sequence number LSN on the page Pi would become greater than the previous log sequence number LSNk.

STEP 40

The data manager DM returns to the query processing unit RDS, which immediately issues a next call on the index scan cursor ISC1.

STEP 42

The index manager IM examines the index scan cursor's ISC1's cursor control block CCB, and notes that previously the scan was positioned on a key on the page Pi. The index manager IM reaccesses the page Pi and checks if the page Pi's log sequence number LSN is still LSNk. The index manager IM does this by finding the page Pi's log sequence number LSN in the cursor control block CCB. Since the page Pi's log sequence number LSN is no longer the previous log sequence number LSNk, the index manager IM can no longer use the logical position information in the index scan cursor's cursor control block ISCCB to determine cheaply what the next key is.

STEPS 44, 46, 48

Instead, in step 44, a determination must be made as to how extensive a search is necessary to find the next key. The index manager IM can still search the same page and locate the next key safely only if it finds that the key K1 is bound on the page, i.e., there is a smaller key and a larger key on the same page (step 46).

This boundedness condition would not be satisfied if, for example, K1 had been the very first key on the page. In this latter case, the index manager IM re-traverses the tree from the root, to locate the next key (step 48). Assuming that no other transaction had altered the page Pi between the time the scan was positioned on K1 and the present time, it is established that the re-traversal would result in the page Pi again being determined to be the correct leaf page to look into, to locate the next key.

DRAWBACK OF CONVENTIONAL METHOD

Note that as long as the qualifying keys for the record deletions span more than one leaf page, it is guaranteed that this deletion-of-first-key-on-page condition will be encountered at least from the second of those leaf pages which contain the qualifying keys. From then on, until the rest of the keys are examined and deleted, for all those next calls the unboundedness condition would hold, thereby forcing the index manager into doing a root-to-leaf traversal on every next call.

The conventional execution strategy does N root-to-leaf traversals during the open and next calls, where N is the number of records to be deleted, if the first qualifying key to be located happens to be the smallest key on the leaf page in which it exists. If the latter condition is not true, then there would be M traversals, where M−1 of the qualifying keys do not exist on the first leaf page in which a qualifying key is found.

These traversals are disadvantageously expensive, especially in terms of CPU costs. In fact, these traversals may also cause unnecessary I/Os, since they ensure that all the ancestors of all the accessed leaves would also be accessed. Ideally, those I/Os should be avoided. The invention guarantees that ideal performance. as long as no other transactions make any changes to the leaf pages of interest during the course of the processing of the set-oriented delete statement.

STEP 50

Per the conventional method, once the next key is located, the index manager IM behaves as described before for the earlier key. The query processing component RDS returns to step 34 and the data manager DM identifies the next record corresponding to the next key that was located. However, before returning to step 34, the index manager IM would unnecessarily lock in S or U mode the found key, without realizing that this key had already been locked in X mode as part of next key locking during the deletion of the earlier key. When the query processing component RDS returns with a delete call in step 34, the record manager RM, in the case of data-only locking, without realizing that the record is already locked in X mode, requests an X lock on the record. When the record manager RM calls the index manager IM to delete the just deleted record's key in Step 36, the index manager, IM again re-traverses the tree to locate that key, and, in the case of index-specific locking, locks that key again in X mode. The conventional technique does this even though it had locked that key in X mode as a result of next key locking during the earlier key deletion.

SUMMARY OF COSTS FOR CONVENTIONAL DELETE

To summarize, the following are the costs involved in performing a set-oriented deletion using the conventional method. In the quantitative expressions given, N is the number of records qualifying for deletion, and M−1 is the number of qualifying keys (out of N) which are not on the first leaf that is accessed:

Data-only locking: 3N lock calls involving N+1 locks
    N S/U-lock calls on records during open and next calls,
    N upgrade-to-X-lock calls on records during record deletions, and
    N X-lock calls on next keys' records during key deletions.

Index-specific locking: 4N lock calls involving 2N+1 locks
    N S/U-lock calls on keys during open and next calls,
    N X-lock calls on records during record deletions,
    N X-lock calls on keys during key deletions, and
    N X-lock calls on next keys during key deletions.

2N or N+M root-to-leaf traversals.
    N root-to-tree traversals during key deletions.
    First qualifying key is smallest key on first leaf accessed:
        N root-to-tree traversals during open and next calls
    First qualifying key is not smallest key on first leaf accessed: M root-to-tree traversals during the last M next calls.

ADVANTAGEOUS PROCESSING TIME SAVINGS OF THE INVENTION

In accordance with the invention, during key deletions, the index manager IM avoids performing root-to-leaf traversals, and the record manager RM avoids looking up the range-scan index's descriptor and reconstructing the key by exploiting the information in the index scan cursor's cursor control block ISCCB. That is, the record manager RM, for the range-scan index only, instead of performing the normal index descriptor lookup and key construction, and invoking the normal key delete index manager IM routine, invokes a new DELETE WHERE CURRENT OF CURSOR command on the index scan cursor's cursor control block ISCCB. Similar savings in processing time are realized during next key searches by again exploiting information in the index scan cursor's cursor control block ISCCB to determine the position of the next key relative to the previous key and by setting a return_current flag to test whether the previous key was deleted. Still further savings are realized by reducing the number of unnecessary lock calls. As described in detail below, the invention determines at the beginning of a transaction whether keys or records satisfying the search criteria can be locked in X mode at the outset or whether residual or non-key column predicates exist that limit initial locking to the S or U modes. The initial lock mode that is determined in this fashion is stored in a lock mode field in the index scan cursor's cursor control block ISCCB and this lock mode information can be used during subsequent key and record deletions to determine if additional locking is necessary.

Figure 3:
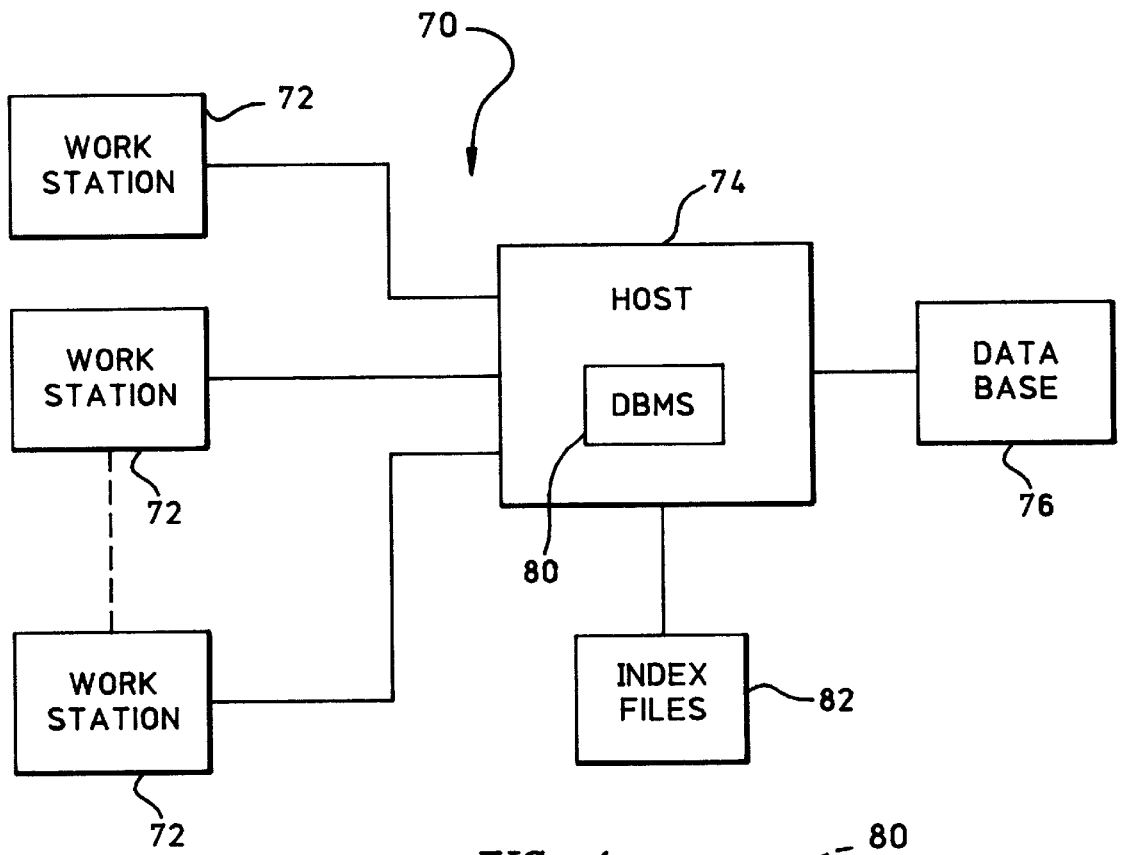
FIG. 3 is a block diagram showing a multi-user database system constructed in accordance with the present invention.

Turning now to FIG. 3, a detailed implementation of a preferred embodiment of the method of the invention will be given. FIG. 3 depicts a block diagram of a concurrent access database system 70 constructed in accordance with the present invention. As can be seen, the concurrent access database system 70 includes a plurality of interactive work stations 72, which are all coupled to a host processor 74. The host processor 74 is then coupled to a database 76. The interactive work stations 72 may be provided using smart or dumb terminals and the host processor 74 may be a general purpose programmable computer. The database 76 is formed by a plurality of data files residing on a data storage medium such as a hard disk data storage system. Those skilled in the art will appreciate that while this particular embodiment is disclosed, a similar system comprised of individual computer clients coupled via local area network to a network server may also be utilized. Each operator of an interactive work station 72 may search, access, or alter records contained within the database 76 by means of a database management system (DBMS) 80 which is typically embodied in the host processor system 70 as a software program written in a high level language such as "C" or the like, and compiled and linked into one or more executable binary modules containing a plurality of machine readable instructions residing on a data storage medium, for performing the functions implemented by the DBMS 80. Those skilled in the art will appreciate that the database 70 is typically provided using index files 82 maintained by the DBMS on a data storage medium accessed by the host processor 74, which are commonly configured in a B-Tree structure, as discussed above.

Figure 4:
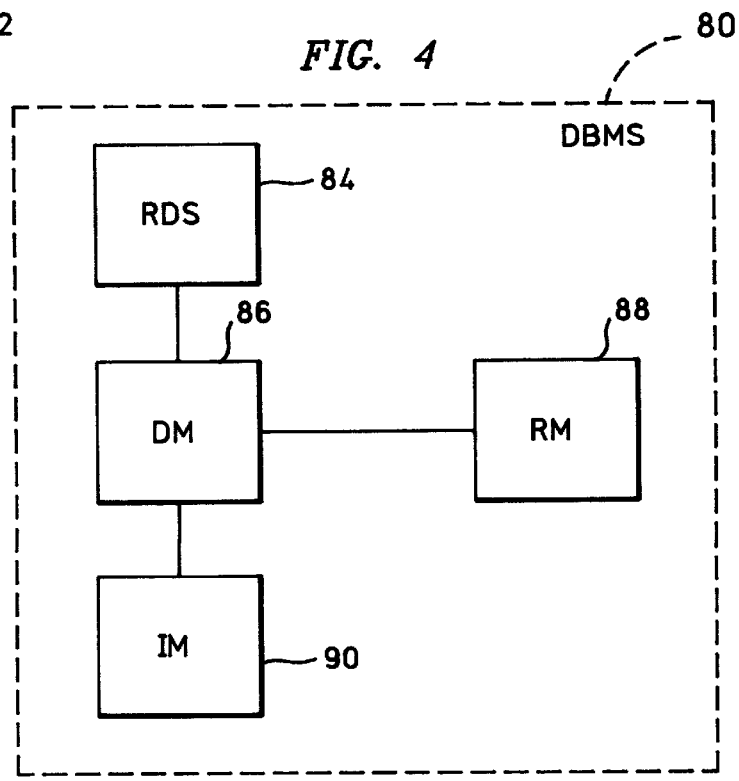
FIG. 4 is a block diagram showing additional aspects of the database system of FIG. 3.
Figure 5A:
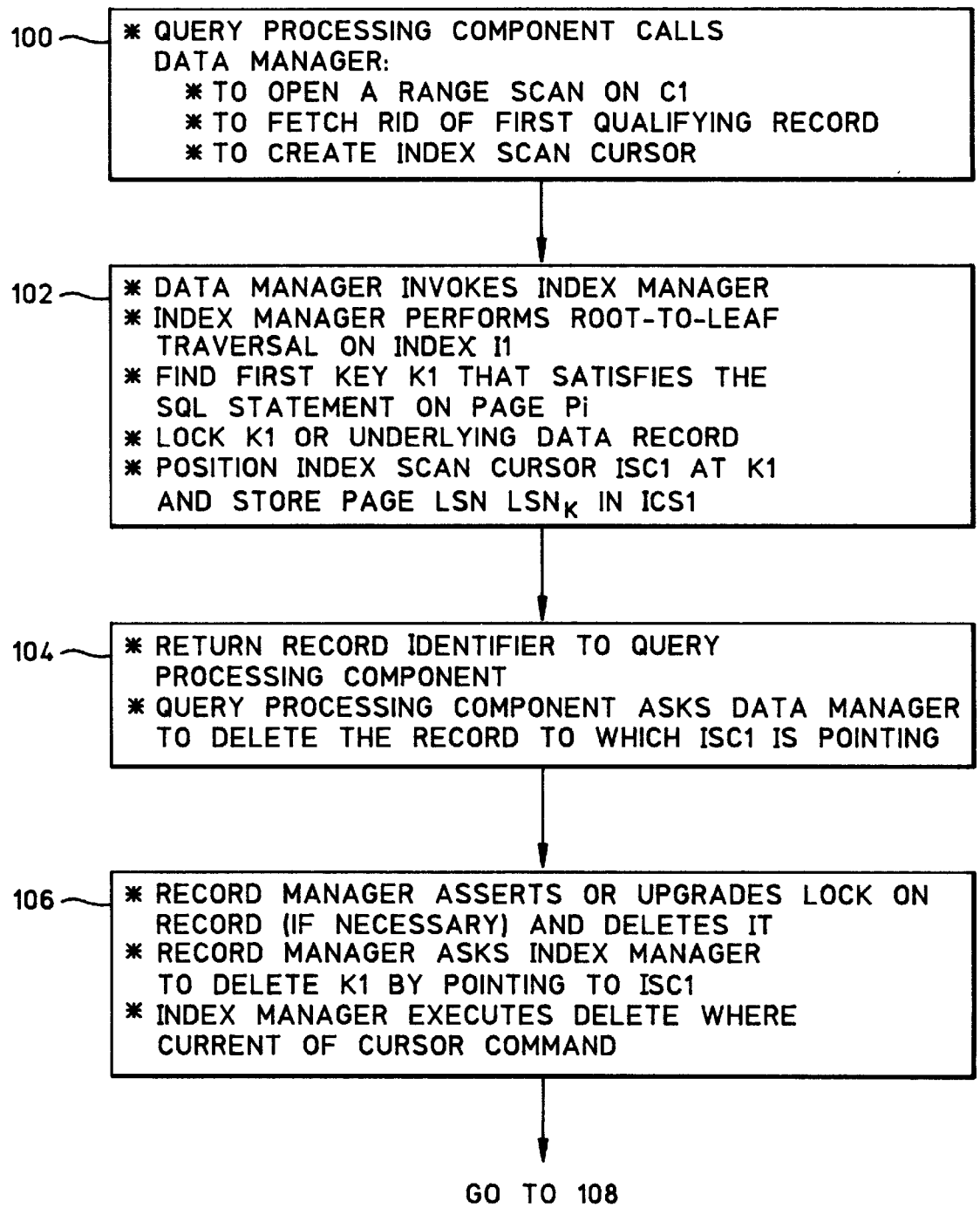
FIGS. 5A, 5B, and 5C are a high-level flowchart showing a method for executing a database command in accordance with the invention.
Figure 5B:
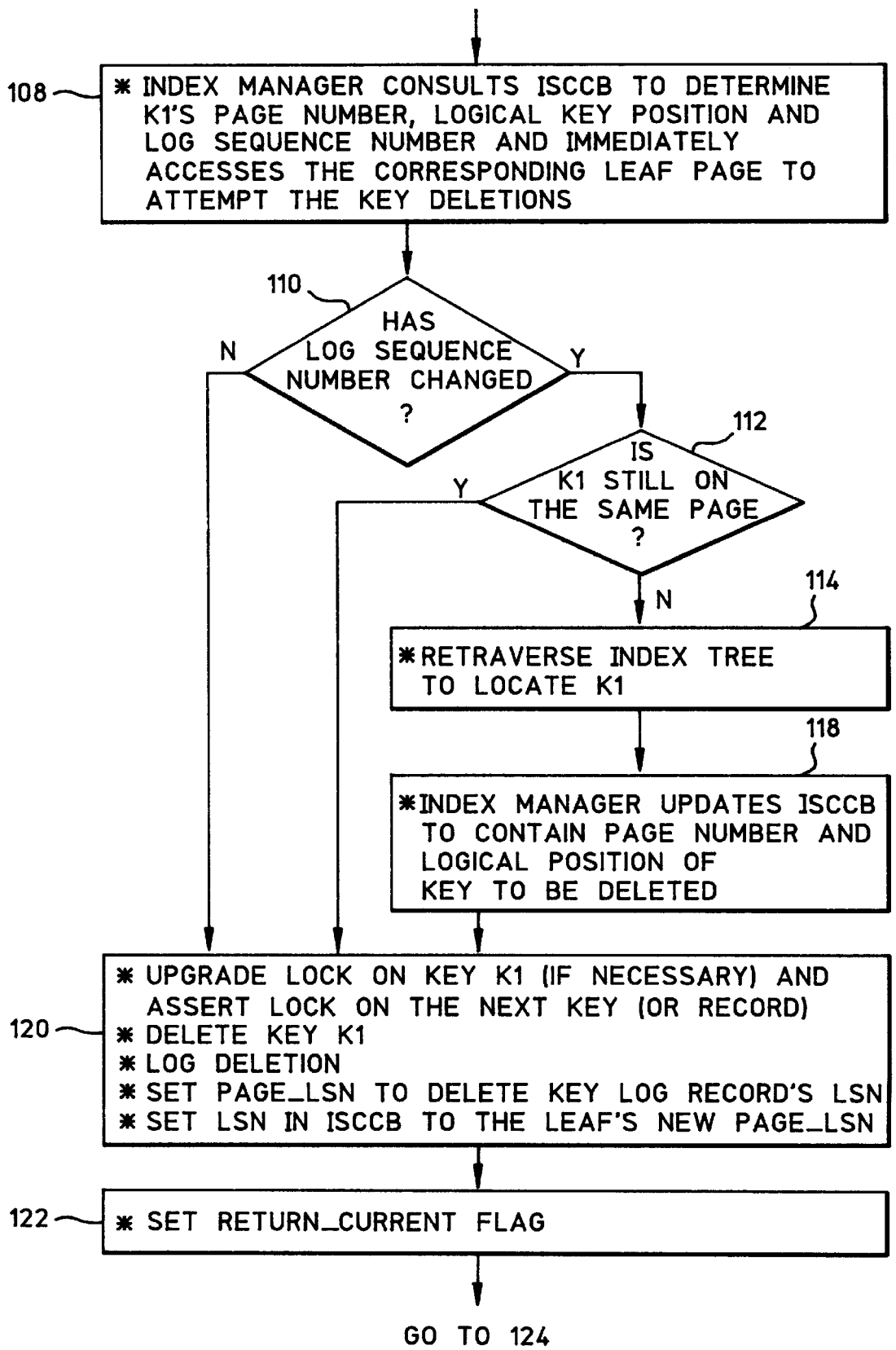
Figure 5C:
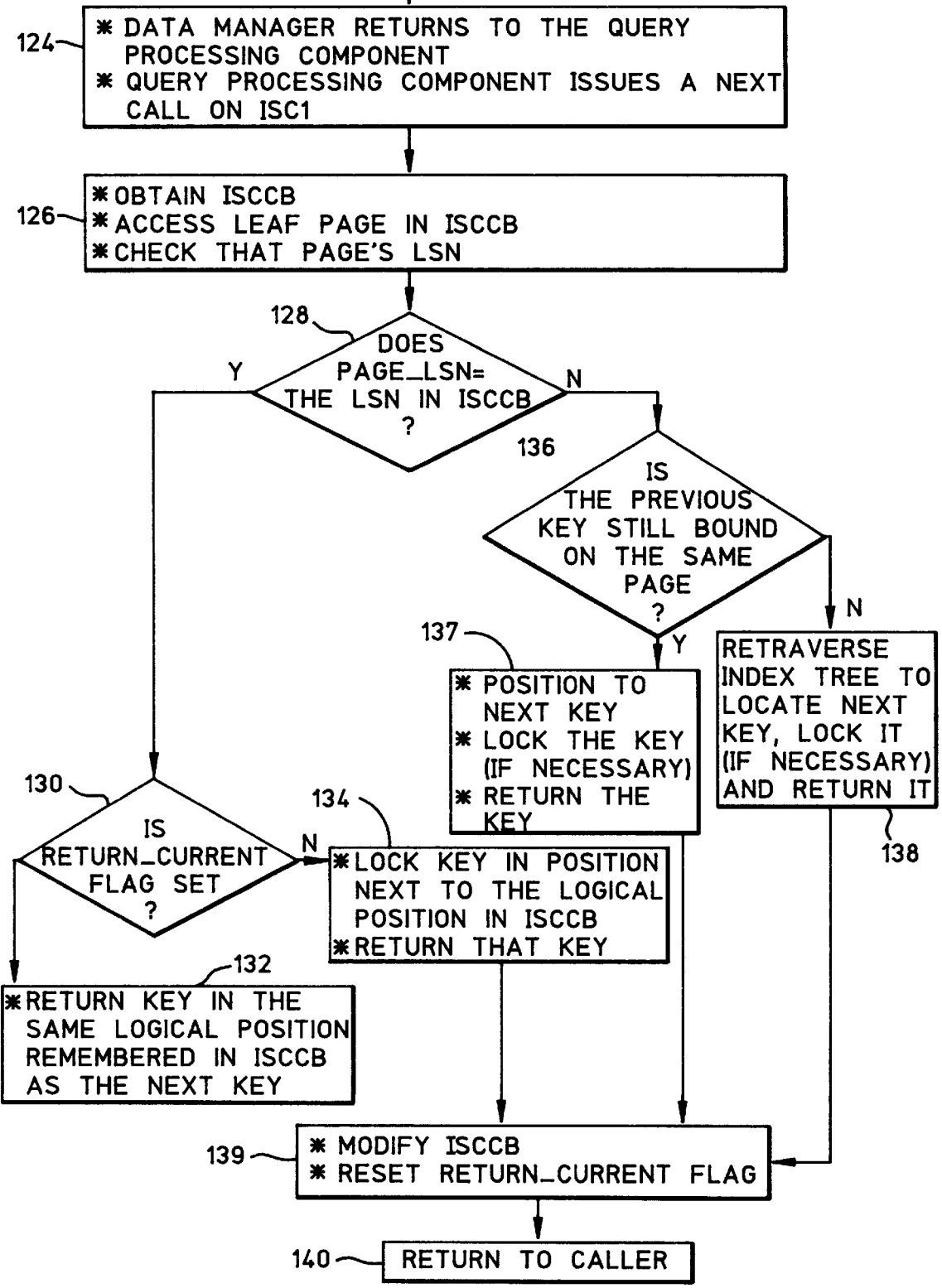

Referring now to FIG. 4, the DBMS 80 includes a set of software modules that implement functions of interest to the invention. Those software modules include the query processing component RDS 84, the data manager DM 86, the record manager RM 88 and the index manager IM 90. The transaction processing steps performed by the DBMS 80 in accordance with a preferred embodiment of the invention will now be described with reference to FIG. 5 and the pseudocode listing in Appendix A hereto.

STEPS 100, 102 and 104

These steps are identical in all respects to the STEPS 30, 32 and 34, respectively, described above in connection with conventional database processing.

STEP 106

The record manager RM 88 acquires an X lock on the identified record RID1 if necessary after consulting the lock mode field in the ISCCB (see below) by upgrading a previous S or U lock (in the case of data-only locking) or by asserting a new lock (in the case of index-specific locking). The record manager RM 88 then deletes the record. Then, instead of reconstructing the key K1 corresponding to the record RID1, the record manager RM 88 requests the index manager IM 90 to delete the key K1 by pointing to ISC1. The index manager IM 90 then invokes the DELETE WHERE CURRENT OF CURSOR command. It does this by calling STEPS 108, 110, 112 and 114.

STEP 108

In processing the DELETE WHERE CURRENT OF CURSOR command, the index manager IM 90 looks at the index scan cursor's cursor control block ISCCB data structure to determine information about the current scan position (page number, logical key position within page and log sequence number LSN on page).

STEP 110

Using the information determined from the index scan cursor's cursor control block ISCCB data structure, the index manager IM 90 checks to see whether the key K1 is still on its current page Pi or whether it was moved to another page as a result of a concurrent transaction's updates to Pi. The key may not be on the same leaf anymore, because another transaction could have done a split of that leaf and moved the key of interest to a different page. In modern concurrent access data bases, in the interest of very high concurrency, one transaction is allowed to move, to a different page, a key which is currently locked by another transaction.

STEPS 112 and 114 If the key K1's page Pi had not changed since the scan was positioned on it, then the index manager IM 90 knows precisely where the key is on the page, and hence it would delete it right away (following appropriate locking if necessary). The index manager IM 90 accesses immediately the corresponding leaf page to do the key deletion. Even if the page Pi's log sequence number has changed (leaf's current page_LSN is greater then LSN in ISCCB), the index manager IM 90 can check to see if the key is still on the same page. Only if the key is no longer on that page anymore, would the index manager IM 90 have to traverse the tree from the root to locate the key. With this approach, when no concurrent changes by other transactions are happening to the leaf pages of interest, N root-to-leaf traversals during key deletions are eliminated. The key reconstruction overheads are also avoided. Note that, in accordance with the invention, the unlock calls and the tree traversals that might be caused by page deletions are not counted, since these would be the same with the conventional method as with the invention.

AVOIDING TRAVERSALS DURING SUBSEQUENT CALLS

Another advantageous aspect of the invention is that the root-to-leaf traversals required by the conventional methods during the next calls can be avoided. In conventional methods, these traversals are required because the LSN on the leaf page changes between the time of retrieval of a key and the time of the retrieval of the following key during a next call. This is due to the intervening key delete call, which causes the currently smallest key on the leaf to be deleted. Since the previously deleted key is no longer bound on the page, IM is unable to safely do a local search on the leaf to locate the next key, which is now actually the smallest key on the page.

Figure 6:
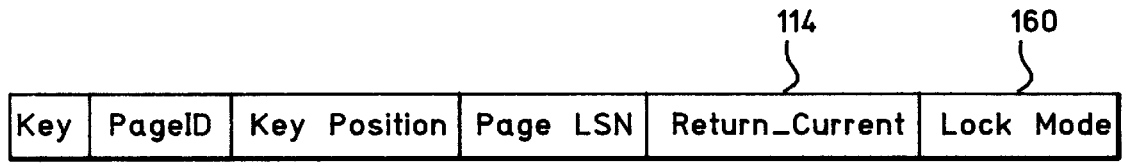
FIG. 6 is a diagrammatic illustration of a cursor control block data structure constructed in accordance with the invention.

In order for it to be possible to safely still return the currently smallest key on the page as the next key, what is needed is a way to know whether the previously returned key was deleted by the current transaction and that the only change that had been made to the page between the time of the previous key lookup and the current one is the deletion of the previously returned key. In some cases, the current transaction may not delete the key due to the existence of non-index predicates which are not satisfied by the current key. In that case, the current key is skipped and the next key in the index is then considered. In accordance with the invention, determining what the next key should be is done by adding a return_current flag 116 to the ISCCB to form a new ISCCB data structure, as shown in FIG. 6. This flag is reset when the ISCCB is created, and also when a key is returned as part of an open or next call.

Returning now to FIG. 5, the invention takes the following steps during the DELETE WHERE CURRENT OF CURSOR operation involving the ISCCB:

STEP 118

If, in step 114, the index manager IM 90 had to search to locate the key to be deleted (since the page_LSN of the leaf whose ID was remembered in ISCCB was greater than the LSN remembered in ISCCB and the key was no longer on the same page), then the index manager IM 90 updates the ISCCB to contain the page number and logical position where the key to be deleted was found. Note that the key value in ISCCB is not modified.

STEP 120

Once the ISCCB is updated in step 118 following an index tree traversal in step 116, or if no tree traversal was required because the key was still on the same page following steps 110 and 112, the key is deleted. If index-specific locking is being done, the key would first be upgraded to an X mode lock if a check of the lock mode field of the ISCCB (see below) determines that it is not already locked in that mode. If data-only locking is being done, then the key would already be locked in X mode as a result of the previous data lock asserted prior to record deletion. In addition, a lock would be asserted on the next key (in the case of index-specific locking) or the next record (in the case of data-only locking) prior to deletion of the current key in step 120. After deleting the current key, the deletion is logged in a delete-key log record data structure. The index page_LSN is then set to the delete-key log record's LSN, and the LSN information in the ISCCB is set to the leafs new page_LSN, such that the ISCCB is now current.

STEP 122

The return_current flag in the ISCCB is set to high (i.e., "1").

STEP 124

As described above in connection with STEP 40, the data manager DM 86 next returns to the query processing component RDS 84, and a next call is immediately issued on ISC1.

STEP 126

The index manager IM 90 obtains the ISCCB, accesses the leaf page remembered in the ISCCB, and check that page's LSN.

STEPS 128, 130 and 132

If the page_LSN is equal to the LSN in ISCCB (step 128) and the return_current flag is set (step 130), then it is known that no page modification operation has occurred since the deletion of the previous key. The index manager IM 90 can thus safely return the key that is presently in the same logical position remembered in the ISCCB as the next key (step 132). Note that there is no need to lock this key before returning it since the locking would have been done during the preceding key's retrieval or deletion. This is how the invention avoids unnecessary relocking, and also traversal, or at least a local binary search, that happens in the conventional method.

STEPS 134 and 136

On the other hand, suppose that the page_LSN is equal to the LSN in ISCCB (step 128), but the return_current flag is not set (step 130). In that case, the previous key was not deleted (because of failure to satisfy some non-index predicate) and the key which is in the position that is next to the logical position remembered in ISCCB is locked and returned as the next key (step 134).

STEPS 136, 137 and 138

If the LSNs do not match (step 128), then the index manager IM 90 attempts to do a local search to see if the previous key is still bound on the same page. If the previous key is still bound on the page then (step 137) the next key is located on the page and locked if necessary (based on the return-current flag's value indicating the previous key was not deleted). If the previous key is not bound on the page, then (Step 138) the index tree is re-traversed to locate the next key. The next key is locked if necessary (based on the return-current flag's value indicating the previous key was not deleted) and the key is returned.

STEP 139

Before returning to the caller, the ISCCB is modified as in the conventional method (recording page number, key, logical position, and LSN) and in addition the return_current flag is reset ('0').

STEP 140

The process returns the next record identifier to the query processing component RDS 84.

LOCKING

Figure 7:
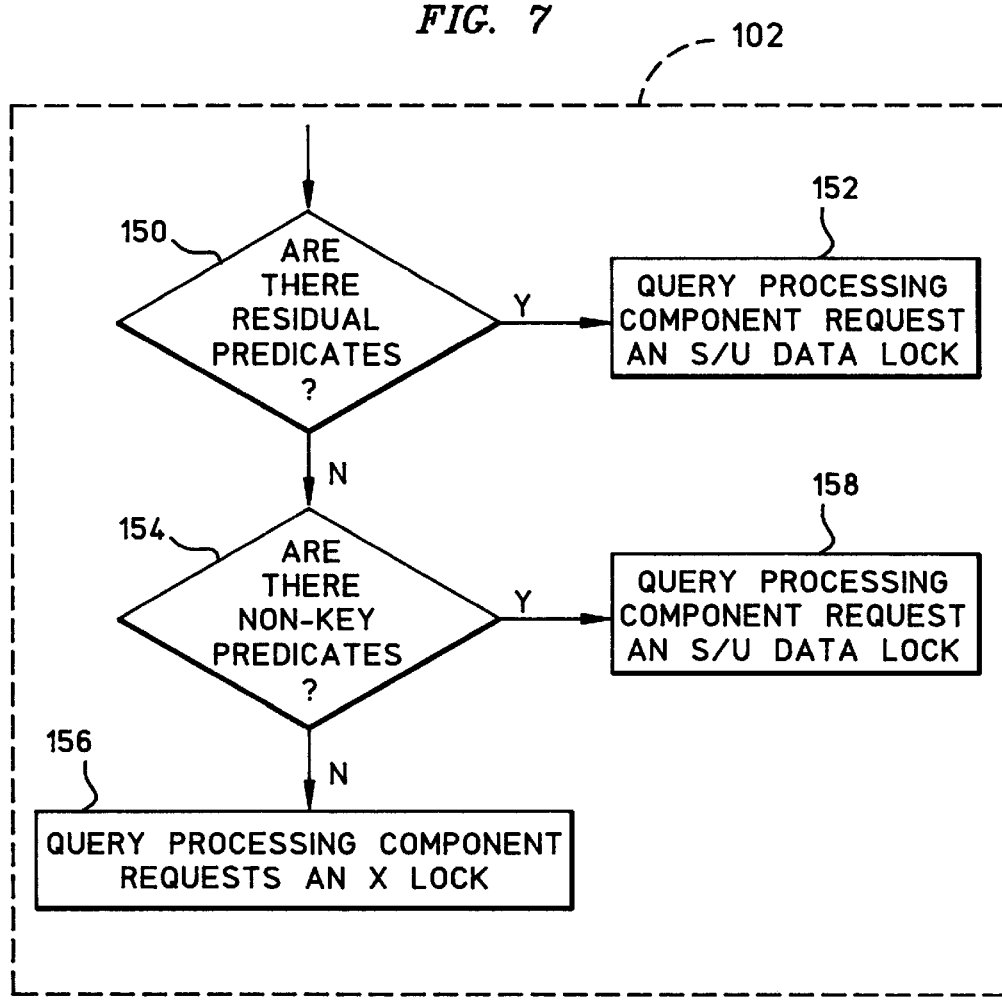
FIG. 7 is a detailed flowchart showing aspects of method step 102 of FIG. 5A using data-only locking.
Figure 8:
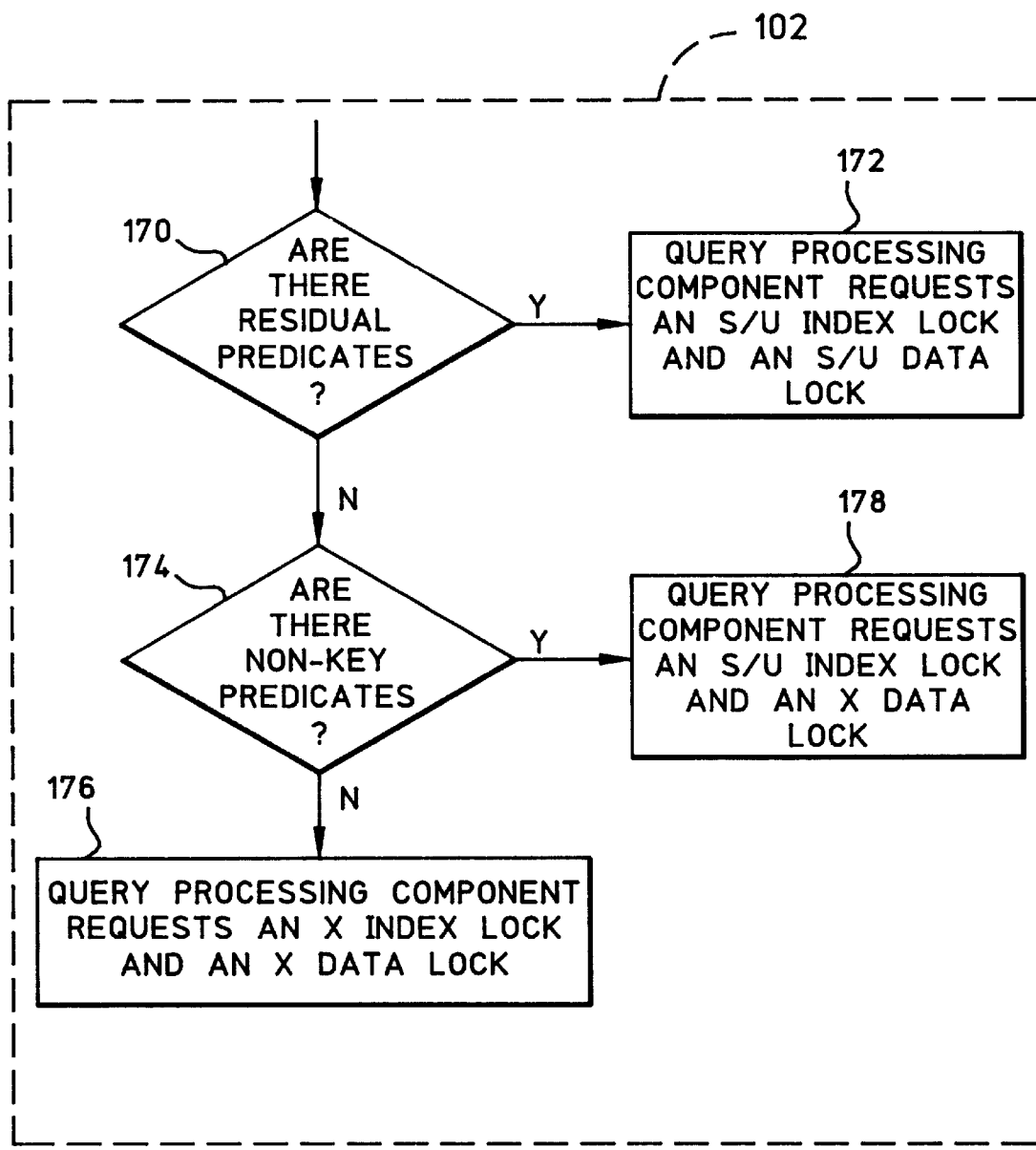
FIG. 8 is a detailed flowchart showing aspects of method step 102 of FIG. 5A using index-specific locking.

As briefly described above, an advantageous aspect of the invention is to avoid unnecessary lock calls. In the case of data-only locking, the conventional method utilizes a two-step process which consists of the initial S/U locking of the record by the index manager IM 90 and the subsequent upgrading of that lock to an X lock prior to deletion. Because it is known that (in the case of the example SQL statement given above) the records of all qualifying keys are going to be deleted, it is advantageously efficient to have only one interaction with the lock manager, and to acquire the X lock at the outset. In accordance with the invention, this is done by making the query processing component RDS 84 request that an X lock be acquired (rather than an S/U lock) on qualifying data when the query processing component RDS 84 knows that all the qualifying data will be deleted (i.e., when the query processing component RDS 84 knows that there are no residual predicates). If there are residual predicates, an S/U lock is acquired on the data. This is shown in steps 150–158 of FIG. 7, pertaining to data-only locking, and steps 170–178 of FIG. 8, pertaining to index-specific locking. These steps represent activities executed by step 100 of FIG. 5 (i.e., before opening an index scan).

With data-only locking, the RDS must also be sure that all the predicates involve only the key columns. Because of this condition, it is desirable to avoid making the index manager IM 90 acquire an X lock on a key's record where the record manager RM 88 subsequently finds that the record does not satisfy some non-key column predicates. If acquiring such a lock were enforced, then concurrency would be disadvantageously reduced. Thus, if residual predicates exist, an S/U data lock is requested. If no residual predicates exist, but non-key predicates exist, an S/U data lock is also requested. Only if there are no residual or non-key column predicates will an X data lock be asserted.

With index-specific locking, the query processing component RDS 84 specifies one mode for the key lock and, if necessary, a separate mode for the data lock. The latter would be necessary if the record needs to be accessed by the record manager RM 88 after the index lookup call, but before returning to the query processing component RDS 84, to evaluate some non-key column predicates. If there are residual predicates, the record lock and the key lock would both be asked for in S/U mode. If there are no residual predicates, the record lock would be asked for in X mode, and the key lock in S/U mode. If there are no non-key column predicates, then the record lock and the key lock would both be asked for in X mode. In that case, both the current and next keys are X locked.

To make the previously given steps work correctly when there are non-key column or residual predicates, the ISCCB preferably includes a mode field 160 (see FIG. 6) which keeps track of the mode in which the returned key or data has been locked. Steps like 120 and 138 which modify the ISSCB will need to update the mode field to reflect the index lock mode in the case of index specific locking, and the data lock mode in the case of data-only locking. The index manager IM 90 examines the mode field information during key deletion (i.e., while performing step 120 of FIG. 5), to make sure that the right index lock is held in the case of index-specific locking or is acquired if necessary before performing the key deletion. Then the index manager IM 90 updates the mode information in the ISCCB to reflect the X lock that it acquires on the next key prior to deletion of the current key. The record manager RM 88 examines the mode field information during record deletion (i.e., while performing step 106 of FIG. 5), to make sure that the right data lock is held in the case of data-only locking or is acquired if necessary before performing the record deletion.

Traditional DBMSs that perform index-specific locking, after accessing an index and retrieving a RID, lock the corresponding record before accessing the record and applying any non-key predicates. In accordance with the present invention, in case there are non-key predicates to be evaluated by the record manager RM 88, the record manager RM does any necessary locking of the record after evaluating the predicate under a latch on the data page. This is done to minimize the duration and/or exclusivity (i.e., S lock rather than X) of locking in the case where the record does not qualify. (See [4] for details of this approach to locking and predicate evaluation.)

SUMMARY OF COSTS OF USE OF THE INVENTION

Using the invention, the following will be the costs involved in performing a set-oriented deletion (like the one given in the example before):

1 root-to-leaf traversal during the open call
Data-only locking: N+1 lock calls involving N+1 locks
  1 X-lock call on a record during the open call,
  N X-lock calls on next keys' records during key deletions.
Index-sipecific locking: 2N+1 lock calls involving 2N+1 locks
  1 X-lock call on the first key during the open call,
  N X-lock calls on records during record deletions,
  N X-lock calls on next keys during key deletions.

POSSIBLE EXTENSIONS OF THE INVENTION

Even though the above description of the invention focuses on set-oriented deletes, the invention also applies, without changes, when the user specifies cursor-based deletes. The techniques disclosed here are also directly applicable to set-oriented updates where the qualifying records are being determined using an index scan, and where that index's key is being updated. Even though, RDBMSs have tended to avoid using such an index to prevent the so-called Halloween Problem, some RDBMSs have started using such an index for update operations, as long as it can be guaranteed that after the update of the key value, the new value will no longer be within the set of key values qualifying for update (see [7] for more details).

When a record is being updated, only the old key can be deleted directly on the leaf page based on the ISCCB. The insert of the new key would most likely require traversing the tree since it is unlikely it will belong on the same page from which the old key was deleted. The idea of the query processing component RDS's specification of the X locking requirement, when there are no residual predicates, is also applicable to other kinds of set-oriented updates, because it reduces the number of interactions with the lock manager.

Also, while the above discussion focused on LSNs and demonstrated applicability to write-ahead logging, the invention is also applicable with other recovery methods like shadow-paging, as long as a version number field exists in the index pages, and its value is incremented on every update. See [3].

Accordingly, a system and method for performing record deletions using index scans has been disclosed. While the invention has been particularly shown and described with reference to a preferred embodiment thereof, it will be understood by those skilled in the art that various other changes in form and detail may be made therein without departing from the spirit and scope of the invention, which is defined solely by the appended claims and their equivalents.

APPENDIX A

PSEUDOCODE FOR PREFERRED EMDODIMENT OF THE INVENTION

Query Processing Component (. . .);
  Data Manager (. . .); // open a range scan on C1, fetch RID of
  First Qualifying record, create index scan cursor //
    Index Manager (. . .);
      perform root-to-leaf traversal on index I1 and arrive at
      the leaf page Pi;
      find first key K1 that satisfies the SQL statement on page Pi;
      lock K1 or underlying data record;
      position index scan cursor ISC1 at K1;
    Return to Data Manager (. . .);
  Return to Query Processing Component (. . .);
  Data Manager (. . .); // Delete the record to which ISC1 is pointing //
    Record Manager (. . .);
      lock record RID if necessary;
      delete record RID;
      Index Manager (. . .); // Delete K1 by pointing to ISC1 and
      executing DELETE WHERE CURRENT OF CURSOR command //
        consult ISCCB to determine K1's page number, logical key
        position and log sequence number;
        immediately access the corresponding leaf page to attempt the
        key deletion;
          if log sequence number has changed and K1 is not still on the
          same page, then
            retraverse index tree to locate K1,
            update ISCCB to contain page number and logical position of
            key to be deleted,
          else,

APPENDIX A-continued

PSEUDOCODE FOR PREFERRED EMDODIMENT OF THE INVENTION

```
   upgrade lock on key K1 (if necessary) and lock the next key;
   delete key K1;
   log the deletion;
   set Page_LSN to delete key log record's LSN;
   set LSN in ISCCB to the leaf's new page_LSN;
   set return_current flag;
  Return to Record Manager (. . .);
  Return to Data Manager (. . .);
Return to Query Processing component (. . .);
Data Manager (. . .); // Query Processing Component invokes
Data Manager to issue a next call on ISC1//
Index Manager (. . .); // Data Manager invokes Index Manager
to obtain the next key //
   obtain ISCCB;
   access leaf page in ISCCB;
   check that page's LSN;
   if Page_LSN does not equal the LSN in the ISCCB and
   the previous key is no longer bound on the same page, then
     retraverse index tree to locate the next key, lock it
     (if necessary) and return that
   key, else
   if Page_LSN does not equal the LSN in the ISCCB and
   the previous key is bound on the same page, then
     position to the next key, lock that key (if necessary) and
     return it, else
   if return_current flag is set, then return key in same
   logical position remembered in ISCCB as the next key and if
   return_current flag is not set, then return key in
   position next to the logical position in ISCCB as the next key;
   modify ISCCB;
   reset return_current flag;
   return to Data Manager (. . .);
   return to Query Processing Component (. . .);
```

What is claimed is:

1. For use with a data base management system in which a cursor is used for specifying one of a plurality of records in a data structure within a data base, a method for performing an operation on the plurality of records within the data structure, the records having related locations searchable in an index file configured as a tree structure and containing a sequence of record keys, comprising the steps of:

selecting the plurality of records using a range scan;

traversing the tree structure to retrieve a first one of said sequence of record keys (hereinafter referred to as the "current key");

storing cursor information representing the location of said current key in a cursor data structure;

performing an operation (hereinafter referred to as the "record operation") on a record (hereinafter referred to as the "current record") corresponding to said current key;

determining whether said current key's tree position has been affected by a concurrent operation following retrieval of said current key; and if determined that said current key's tree position has not been affected by a concurrent operation following retrieval of said key, using said cursor information in said cursor data structure to locate and update said current key to reflect said record operation without retraversing the tree structure.

2. A method as recited in claim 1, further comprising the steps of:

determining whether said current key's tree position has been affected by a concurrent operation following updating of said current key; and if said current key's tree position has not been affected by another concurrent operation following updating of said current key, using said cursor information to locate a next one (next key) of said sequence of record keys corresponding to a next record.

3. A method as recited in claim 2 wherein said cursor data structure includes fields for determining whether said current key's tree position has been affected by a concurrent operation.

4. A method as recited in claim 3 wherein said current key is located on a page representing a leaf node of said index tree structure and wherein said fields for determining whether said current key's tree position has been affected by a concurrent operation include a field representing a page number on which said current key is located and a field representing a log sequence number of said page.

5. A method as recited in claim 4 wherein said step of determining whether said current key's tree position has been affected by a concurrent operation following retrieval or update of said current key includes determining whether changes have occurred to said page's log sequence number.

6. A method as recited in claim 5 wherein said cursor information is used to update said current key if the page number corresponding to said current key has not changed.

7. A method as recited in claim 2 wherein said cursor data structure further includes a field for determining whether said current key was updated in order to help locate said next key when said current key has not been affected by a concurrent operation following updating of said current key.

8. A method as recited in claim 1, further comprising the step of, upon locating said current key, determining whether additional operational predicates exist and, if true, asserting a nonexclusive lock on said current record, if record locking is being performed by said database management system, or on said current key, if index-specific locking is being performed by said database management system, and, if false, asserting an exclusive lock on said current record, if record locking is being performed by said database management system, or on said current key, if index-specific locking is being performed by said database management system.

9. A method as recited in claim 8, wherein said record operation is a record delete or update operation and said current key is updated by deleting said key, and further wherein said step of locking said current record or said current key includes the step of locking said next record or next key, respectively.

10. A method as recited in claim 8 wherein said cursor data structure includes a field for determining the status of the lock on said current key or the lock on said current record.

11. For use with a data base management system in which a cursor is used for specifying one of a plurality of records in a data structure within a data base, a system for performing an operation on the plurality of records within the data structure, the records having related locations searchable in an index file configured as a tree structure and containing a sequence of record keys, comprising:

means for selecting the plurality of records using a range scan;

means for traversing the tree structure to retrieve a first one of said sequence of record keys (hereinafter referred to as the "current key");

means for storing cursor information representing the location of said current key in a cursor data structure;

means for performing an operation (hereinafter referred to as the "record operation") on a record (hereinafter referred to as the "current record") corresponding to said current key;

means for determining whether said current key's tree position has been affected by a concurrent operation following retrieval of said key; and means for using said cursor information in said cursor data structure to locate and update said current key to reflect said record operation without retraversing the tree structure, if determined that said current key's tree position has not been affected by a concurrent operation following retrieval of said key.

12. A system as recited in claim 11, further comprising:

means for determining whether said current key's tree position has been affected by concurrent operation following updating of said current key; and means for using said cursor information to locate a next one (next key) of said sequence of record keys corresponding to a next record, if said current key's tree position has not been affected by a concurrent operation following updating of said current key.

13. A system as recited in claim 12 wherein said cursor data structure includes fields for determining whether said current key's tree position has been affected by a concurrent operation.

14. A system as recited in claim 13 wherein said current key is located on a page representing a leaf node of said index tree structure and wherein said fields for determining whether said current key's tree position has been affected by a concurrent operation include a field representing a page number on which said current key is located and a field representing a log sequence number of said page.

15. A system as recited in claim 14 wherein said means for determining whether said current key's tree position has been affected by a concurrent operation following retrieval or update of said current key includes means for determining whether changes have occurred to said page's log sequence number.

16. A system as recited in claim 15 wherein said cursor information is used to update said current key if the page number corresponding to said current key has not changed.

17. A system as recited in claim 12 wherein said cursor data structure further includes a field for determining whether said current key was updated in order to help locate said next key when said current key has not been affected by a concurrent operation following updating of said current key.

18. A system as recited in claim 11, further comprising means for determining, upon locating said current key, whether additional operational predicates exist and, if true, asserting a nonexclusive lock on said current record, if record locking is being performed by said database management system or on said current key, if index-specific locking is being performed by said database management system, and, if false, asserting an exclusive lock on said current record, if record locking is being performed by said database management system, or on said current key, if index-specific locking is being performed by said database management system.

19. A system as recited in claim 18, wherein said record operation is a record delete or update operation and said current key is updated by deleting said key, and further wherein said means for locking said current record or said current key includes means for locking said next record or next key, respectively.

20. A system as recited in claim 18 wherein said cursor data structure includes a field for determining the status of the lock on said current key or the lock on said current record.

21. For use with a data base management system in which a cursor is used for specifying one of a plurality of records in a data structure within a data base, a computer program product for performing an operation on the plurality of records within the data structure, the records having related locations searchable in an index file configured as a tree structure and containing a sequence of record keys, comprising:

a data storage medium;

means recorded on said data storage medium for selecting the plurality of records using a range scan;

means recorded on said data storage medium for traversing the tree structure to retrieve a first one of said sequence of record keys (hereinafter referred to as the "current key");

means recorded on said data storage medium for storing cursor information representing the location of said current key in a cursor data structure;

means recorded on said data storage medium for performing an operation (hereinafter referred to as the "record operation") on a record (hereinafter referred to as the "current record") corresponding to said current key;

means recorded on said data storage medium for determining whether said current key's tree position has been affected by a concurrent operation following retrieval of said key; and means recorded on said data storage medium for using said cursor information in said cursor data structure to locate and update said current key to reflect said record operation without retraversing the tree structure, if determined that said current key's tree position has not been affected by a concurrent operation following retrieval of said key.

22. A computer program product as recited in claim 21, further comprising:

means recorded on said data storage medium for determining whether said current key's tree position has been affected by a concurrent operation following updating of said current key; and means recorded on said data storage medium for using said cursor information to locate a next one (next key) of said sequence of record keys corresponding to a next record, if said current key's tree position has not been affected by a concurrent operation following updating of said current key.

23. A computer program product as recited in claim 22 wherein said cursor storage structure includes fields for determining whether said current key's tree position has been affected by a concurrent operation.

24. A computer program product as recited in claim 23 wherein said current key is located on a page representing a leaf node of said index tree structure and wherein said fields for determining whether said current key's tree position has been affected by a concurrent operation include a field representing a page number on which said current key is located, and a field representing a log sequence number of said page.

25. A computer program product as recited in claim 24 wherein said means for determining whether said current key's page position has been affected by a concurrent operation following retrieval or update of said current key includes means recorded on said data storage medium for determining whether changes have occurred to said page's log sequence number.

26. A computer program product as recited in claim 25 wherein said cursor information is used to update said current key if the page number corresponding to said current key has not changed.

27. A computer program product as recited in claim 22 wherein said cursor data structure further includes a field for determining whether said current key was updated in order to help locate said next key when said current key has not been affected by a concurrent operation following updating of said current key.

28. A computer program product as recited in claim 21, further comprising means recorded on said data storage medium for determining, upon locating said current key, whether additional operational predicates exist and, if true, asserting a nonexclusive lock on said current record, if record locking is being performed by said database management system, or on said current key, if index-specific locking is being performed by said database management system, and, if false, asserting an exclusive lock on said current record, if record locking is being performed by said database management system, or on said current key, if index-specific locking is being performed by said database management system.

29. A computer program product as recited in claim 28, wherein said record operation is delete or update operation and said current key is updated by deleting said key, and further wherein said means for locking said current record or said current key includes means recorded on said data storage medium for locking said next record or next key, respectively.

30. A computer program product as recited in claim 28 wherein said cursor data structure includes a field for determining the status of the lock on said current key or the lock on said current record.

* * * * *